United States Patent [19]

Hubert

[11] Patent Number: 5,563,374
[45] Date of Patent: Oct. 8, 1996

[54] FLEXIBLE PIPE COUPLING

[75] Inventor: Andreas Hubert, Fredenbeck, Germany

[73] Assignee: Daimler-Benz Aerospace Airbus GmbH, Hamburg, Germany

[21] Appl. No.: 263,452

[22] Filed: Jun. 22, 1994

[30] Foreign Application Priority Data

Jun. 25, 1993 [DE] Germany .................. 43 21 162.3

[51] Int. Cl.⁶ ..................................... H01B 7/00
[52] U.S. Cl. .................. 174/84 R; 174/84 S; 174/85; 285/406
[58] Field of Search ................. 174/85, 84 R, 174/84 S, 75 R, 75 D, 21 JS, 21 R, 19; 285/235, 236, 363, 364, 368, 405, 406

[56] References Cited

U.S. PATENT DOCUMENTS

| | | |
|---|---|---|
| 768,228 | 8/1904 | Hurst . |
| 1,783,410 | 12/1930 | Cowell . |
| 2,617,672 | 11/1952 | Nichols . |
| 3,994,518 | 11/1976 | Pollock ................. 285/406 |
| 4,763,695 | 8/1988 | Dooley ................. 285/236 |
| 5,166,475 | 11/1992 | Ackerman et al. ........ 174/47 |
| 5,185,497 | 2/1993 | Poth ................. 174/21 C |

FOREIGN PATENT DOCUMENTS

| | | | |
|---|---|---|---|
| 152753 | 8/1985 | European Pat. Off. ........ 285/405 |
| 99105 | 5/1923 | Switzerland ................ 285/406 |

OTHER PUBLICATIONS

ABS0395 Flexible Coupling Jul. 90.

Primary Examiner—Laura Thomas
Assistant Examiner—Chau N. Nguyen
Attorney, Agent, or Firm—W. G. Fasse; W. F. Fasse

[57] ABSTRACT

A flexible pipe coupling is constructed for flexibly interconnecting pipe sections especially in a vacuum toilet system on board an aircraft. For this purpose each coupling member of a pair forming the coupling has a bushing for connection to a pipe end by a hose clamp, a flange integrally connected to the bushing, and a support ring for backing the respective flange but permitting the flange to retain a certain flexibility. Each support ring has a conical circumferential rim. The coupling also includes a clamp member encircling with radially inwardly facing conical surfaces the radially outwardly facing conical rim of both support rings to clamp the coupling members together. The clamp member has a threaded or snap device for applying the clamping force.

14 Claims, 3 Drawing Sheets

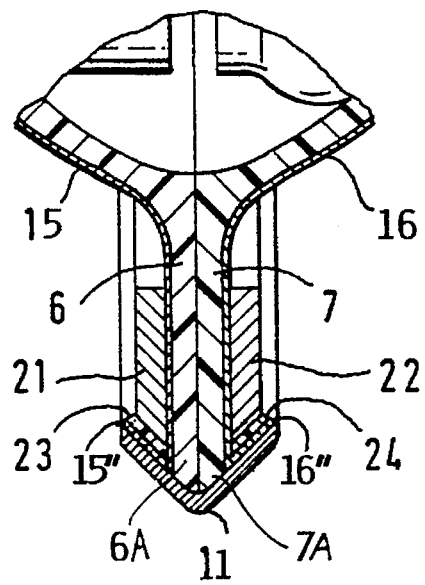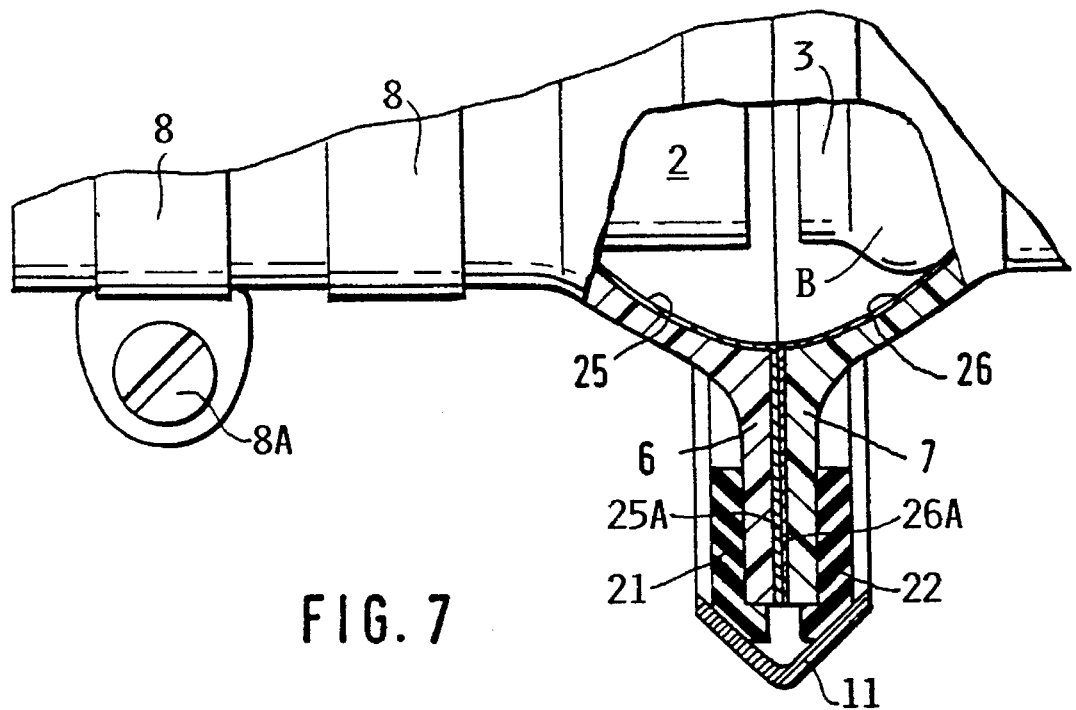

5,563,374

FLEXIBLE PIPE COUPLING

FIELD OF THE INVENTION

The invention relates to flexible pipe couplings especially constructed for interconnecting pipe sections in a vacuum toilet system, particularly on board of an aircraft.

BACKGROUND INFORMATION

It is known to use flanged pipe ends for interconnecting such pipe ends, for example, in accordance with "Standard ABS 0395". In these connections of two metallic pipe ends, the pipe ends themselves are provided with flanges either produced by a rolling operation applied to each pipe end or by securing a flange element to the pipe end, for example, by welding. The circumferential surface of each flange comprises a circumferentially extending radially inwardly reaching groove into which an O-ring is inserted. Each flange has its own O-ring. In the assembled state of the coupling the two flanges are positioned inside a cylindrical sleeve which encloses the flanges. The sleeve has such an inner diameter that its inner surface presses the O-rings radially inwardly. The sleeve is secured with a hose clamp against axial displacement. However, an axial play is provided in order to compensate for length deviations. An angular deviation of ±4° is also permissible. The tightening of the hose clamp is accomplished by self-locking snap closures.

In order to assure a good electrical contact between both pipe sections, the hose clamp is provided with contact springs which have a projection that bears against the respective flange.

The above described pipe couplings require a relatively large number of individual elements which do not facilitate, nor do they speed up the assembly of these couplings, since each element must be checked and care must be taken that each element is in the correct required position relative to all other elements. When repairs must be made, difficulties are encountered because the flange portions integrally connected to the pipe ends are not easily removed due to the welded or rolled connection. Another problem with conventional couplings exists in that the electrical transition resistance between the contact springs and the metallic pipes increases with time due to corrosion.

OBJECTS OF THE INVENTION

In view of the above it is the aim of the invention to achieve the following objects Singly sr in combination:

to construct a pipe coupling so that fewer parts are needed, that a good permanent electrical connection between the interconnected pipe sections is assured for grounding purposes, and that the assembly and repairs are greatly facilitated compared to the prior art;

to avoid the use of flanges that are or become a permanent part of the pipe ends to be connected to each other;

to construct the coupling in such a way that its closure or tightening and its opening and removal are equally simple and quick; and to make sure that the electrical contact is established without regard to any precise axial and/or angular orientation of the pipe ends relative to each other.

SUMMARY OF THE INVENTION

The above objects have been achieved according to the invention by a flexible pipe coupling which is characterized by two flanged bushings or two bushed flanges, whereby each bushing and its flange forms an integral single piece. The flange and bushing are made of relatively flexible material and are provided with an electrically conducting surface, such as a conducting film or contact layer, wherein the bushings extend externally around the pipe ends to which each bushing is secured by at least one hose clamp. The axially facing back surface of each flange opposite its surface facing the other flange of a pair, is provided with a support ring having a circumferential rim with a conical surface cooperating with a radially inwardly facing slanted or conical surface of a clamp member that presses the support rings tightly against the flanges when the clamp member is tightened, for example by a threaded connection. The cooperation of the conical surfaces provides an axially effective force component that assures a tight seal.

It is a special advantage of the invention that the connection between the bushings and the pipe ends are easily established and also removed again due to the use of hose clamps for the bushings and a clamp member for holding the flanges together.

BRIEF DESCRIPTION OF THE DRAWINGS

In order that the invention may be clearly understood, it will now be described, by way of example, with reference to the accompanying drawings, wherein:

FIG. 6 is a view similar to that shown in FIGS. 4 and 5, however illustrating a modification in which the contact between the two electrically conducting layers is established through the clamp member; and FIG. 7 is a view illustrating the arrangement of the contact layers on the inside of the bushings and flanges, whereby the surfaces of the flanges that face each other are provided with the electrically conducting layer.

DETAILED DESCRIPTION OF PREFERRED EXAMPLE EMBODIMENTS AND OF THE BEST MODE OF THE INVENTION

Figure 1:
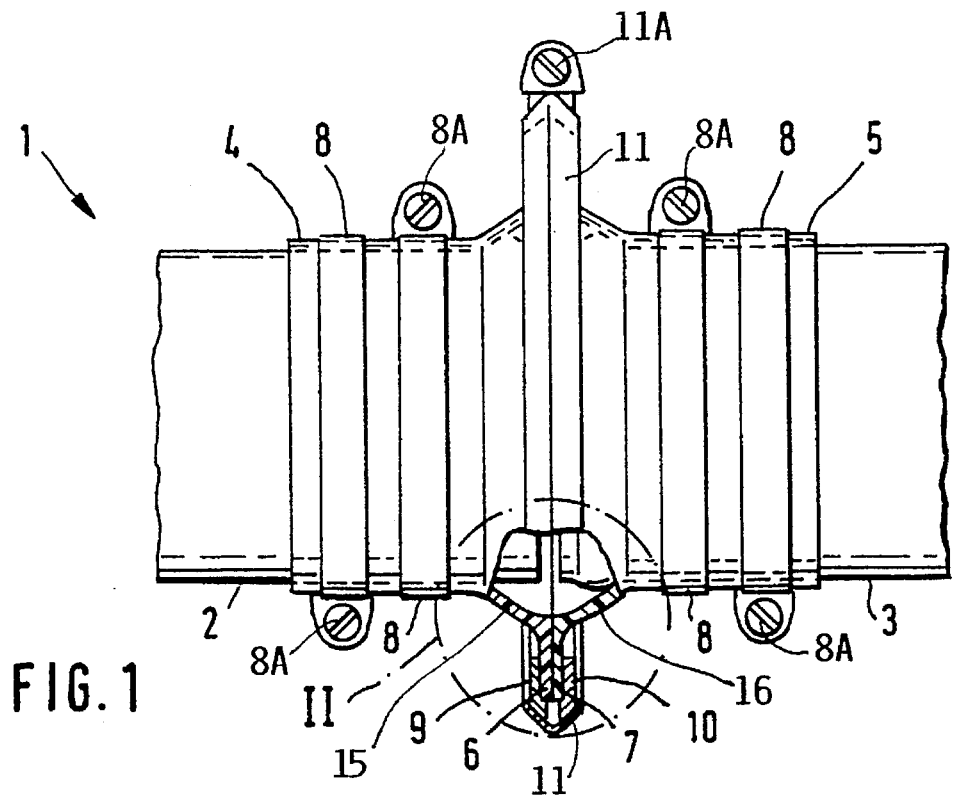
FIG. 1 is a side view partly in section of a flexible pipe coupling according to the invention.
Figure 2:
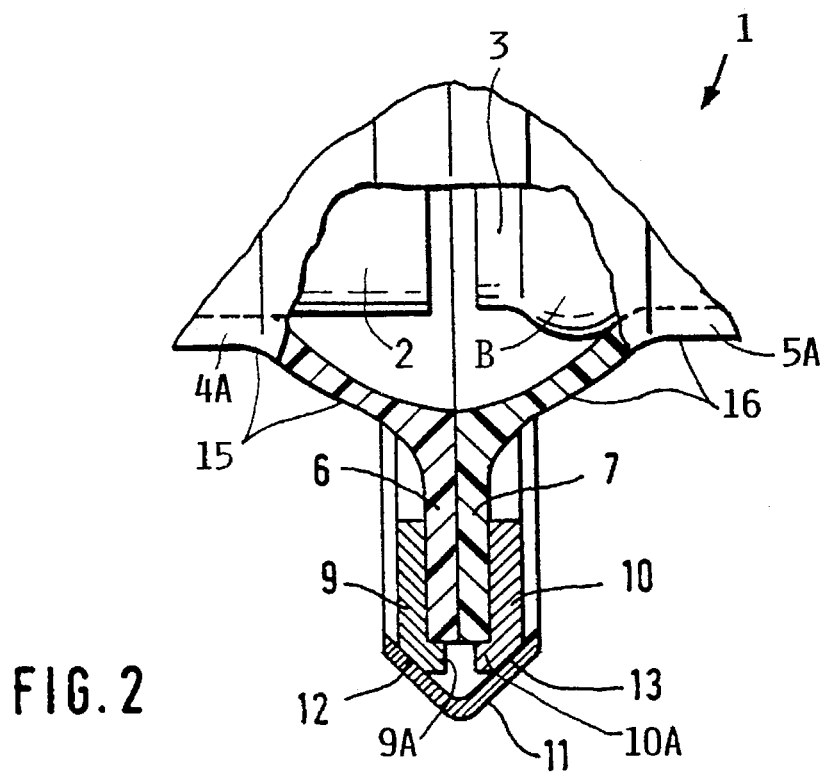
FIG. 2 shows on an enlarged scale a sectional view of the detail II in FIG. 1.

FIGS. 1 and 2 show a pipe connection 1 securing two pipe ends 2 and 3 to each other. Preferably, both pipe ends 2, 3 are provided with a radially outwardly bulging bead B. However, such beads are merely preferred, but not necessary. The flexible coupling according to the invention comprises two coupling members 4 and 5 forming a pair. Each coupling member has a bushing section 4A, 5A and a flange 6, 7, respectively. The bushing sections and flanges are connected to each other to form a single piece, integral component made of a flexible material such as a suitable plastics material, reinforced silicon rubber and the like. The bushing sections 4A, 5A are tightly received on the outer surfaces of the respective pipe end 2, 3 and are held in place by at least one, preferably two hose clamps 8 that can be tightened, for example, by a threaded connection or clamping lock 8A or by a snap-on connection not shown. Where a bead B is used, the bushing section 4A, 5A is sufficiently flexible to push it over the bead to position the bushing on the pipe end 2 or 3, respectively.

In the embodiment of FIGS. 1 and 2 the bushing sections 4A, 5A and the flanges 6, 7 are provided with an outer electrically conducting film 15 and 16 respectively. The axial ends of these films 15, 16 reach around the free ends of the respective bushing section 4A, 5A to electrically contact the metal pipe ends 2 and 3 as shown at 15A in FIG. 3. In this manner it is possible to electrically connect the pipe ends 2 and 3 to each other, for example, for grounding purposes as is described in more detail below. The electrically conducting surface or film 15, 16 may, for example, be a vapor deposited metal film.

As best seen in FIG. 2, each flange 6, 7 is provided with an electrically conducting support ring 9 and 10 having a circumferential conical surface 12 and 13 respectively cooperating with radially inwardly facing respective conical surfaces of a clamp member 11 that may also be closed by a screw connection as shown at 11A or by a snap connection. The support rings 9 and 10 and the clamp member 11 are made of metal and therefore provide for an electrical path from one pipe end to the other through the conducting surface 15, the ring 9, the clamp member 11, the ring 10 and the surface 16 that is electrically connected to the pipe 3 as described above and as shown at 15B in FIG. 3 for the left-hand pipe section 2. Due to the cooperation of the conical surfaces at 12 and 13, an axial clamping force component is exerted on the support rings 9 and 10 to clamp the flanges and 7 to each other in a sealed manner.

Figure 3:
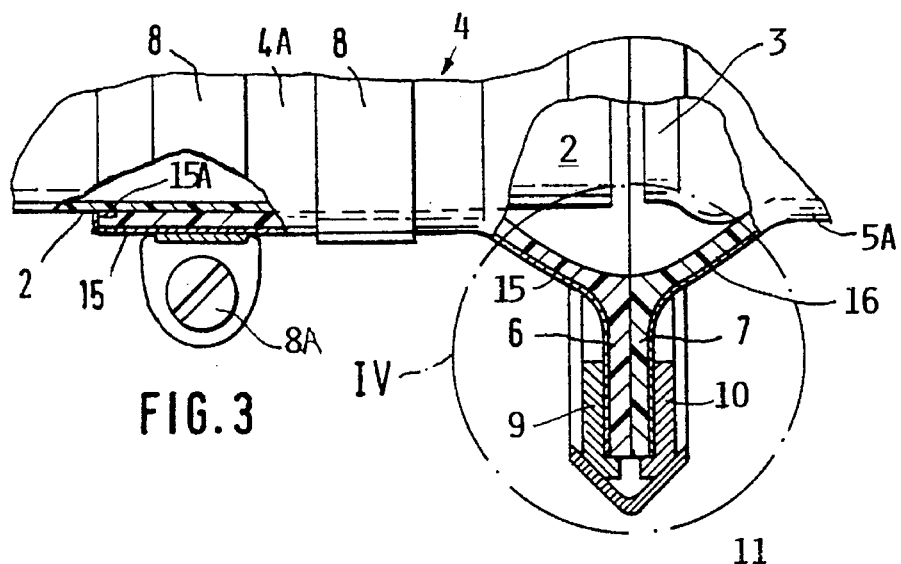
FIG. 3 is a view similar to that of FIG. 1, however, showing an embodiment with an electrical conductor layer extending on the outside of the bushing and flange, except for a portion of the electrical conductor layer on the inside of the bushings.

As shown in FIG. 2, the support rings 9 and 10 have a radially extending ring portion and an axially extending portion 9A and 10A reaching as a rim around the circumference of the respective flange 6, 7. However, such axially extending portions 9A and 10A are not absolutely necessary, please see FIG. 6, for example. FIG. 3 shows a partial broken away view of a pipe coupling according to the invention with the bushing 4A and only part of the bushing 5A. The bushing 4A is secured to the end 2 of the pipe by two hose clamps 8, each provided with the above mentioned threaded clamping lock 8A. The outer surface of the bushing 4A and the flange 6 is also provided with the above mentioned electrically conducting layer or film 15 that reaches around the axially free end of the bushing 4A to form a contact ring 15A that is in electrical contact with the surface of the pipe end 2. The bushing 5A and the flange 7 is provided with a corresponding electrically conducting surface layer 16, the axially free end of which also reaches around the free end of the bushing 5A into contact with the pipe 3. Preferably, the contact rings 15A and a respective portion of the surface layer 16A are clamped under a respective hose clamp 8 to assure a good electrical contact circumferentially all around the respective pipe. The electrical path around the radially outer circumference of the flanges 6 and 7 is again established through the electrically conducting support rings 9 and 10 and through the electrically conducting clamp member 11.

Figure 4:
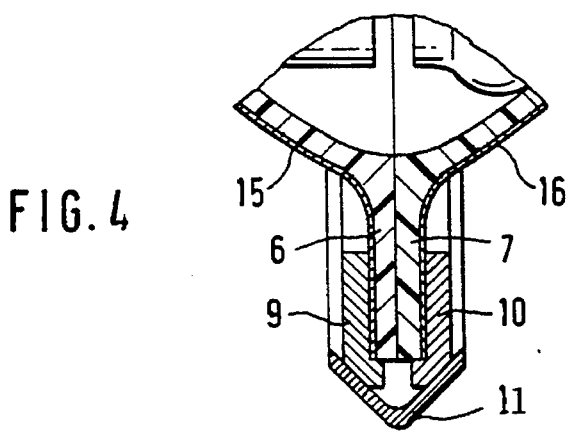
FIG. 4 is a sectional view on an enlarges scale of the detail IV in FIG. 3.

FIG. 4 shows that it is preferred to let the radially outer portions of the surface conductor layers 15 and 16 to reach radially outwardly all the way to the rim of the respective flange 6 or 7. This feature assures a larger contact surface area between the radially outer portions of the conductor layers 15, 16 and the respective support rings 9, 10. However, it should be mentioned, that it is sufficient for the surface layers 15, 16 to just reach into contact with the respective support ring 9, 10 without actually extending all the way to the circumferential rim of the flanges 6 and 7. In both instances a good electrical contact is established between the pipe ends 2 and 3 through the contact surface layers 15, 16, the rings 9, 10 and the clamp member 11.

Figure 5:
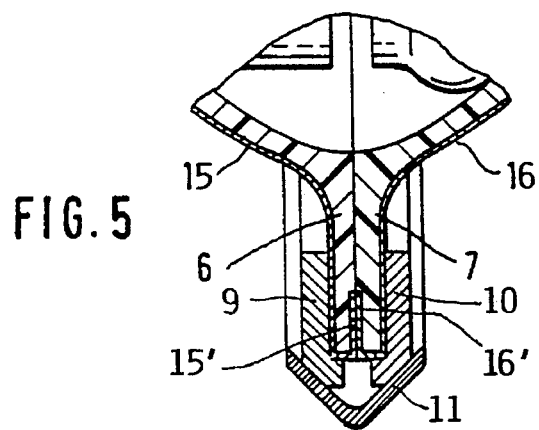
FIG. 5 shows a modification of FIG. 4 with contact layers having extension portions positioned radially between the two facing surfaces of the flanges.

FIG. 5 shows a modification in which the contact layers 15 and 16 have radially inwardly extending portions 15' and 16' clamped between the flanges 6 and 7. The construction of the rings 9 and 10 and the clamp member 11 is the same as described above.

In FIG. 6 the electrically conducting surface layers 15 and 16 have end portions 15" and 16" which reach at an angle outwardly rather than inwardly as in FIG. 5. Thus, these ends 15" and 16" are clamped between the conical surfaces or rim portions of the support rings 21 and 22 on the one hand, and the inwardly facing slanted surfaces of the clamp member 11. If desired, an elastomeric layer 23, 24 may be interposed between the support rings 21, 22 and the conducting end portions 15", 16" bearing against the clamp member 11. These elastomeric layers 23, 24 assure an elastic contact pressure between the end conducting end portions 15 and 16 and the clamp member 11 which, due to its V-cross-sectional configuration may also be referred to as a "V-clamp". In FIG. 6 the flanges 6 and 7 have conical rims 6A and 7A reaching into the radially inwardly facing bottom of the V-groove of the V-clamp 11.

In the embodiment of FIG. 7 electrically conducting surface layers or films 25 and 26 are provided on the inside of the bushings and flanges rather than on the outside as in the above described embodiments. Radial ring portions 25A and 26A are clamped between the flanges 6 and 7 by the support rings 21 and 22 under the action of the V-clamp 11.

The parts of the present flexible pipe coupling may be produced of any suitable materials. In the preferred embodiment the coupling members including the flanges and bushings are made of a glass fiber reinforced silicon rubber and the remaining components e.g. the pipes 2, 3 and the electrical contact films or layers are made of stainless steel. In order to save weight, it is possible to also make the support rings 21, 22 of a sufficiently stiff synthetic material rather than of metal. Such an embodiment is feasible for example in the construction of FIG. 7 where the electrical contact passes directly through the radial rings 25A, 26A of the electrically conducting inner layers 25 and 26 and not through the rings 21 and 22 nor through the clamp member 11.

In all the embodiments the support rings are sufficiently stiff for the intended purpose of clamping. The support rings are connected to the flexible flanges, for example by an adhesive bonding or by vulcanizing. However, the support rings have an inner hole of sufficient diameter to leave a radially inner portion of the flange 6 and 7 free to flex.

In a preferred embodiment the contact layers 15, 16, etc. are made of a metal webbing or wire mesh material which may be applied as individual strips or in the form of wire mesh hose. Preferably, the respective surface areas are completely covered by the surface conducting layer which may also be formed as a metal foil or as a vapor deposited metal film.

Although the invention has been described with reference to specific example embodiments, it will be appreciated that it is intended to cover all modifications and equivalent within the scope of the appended claims.

What is claimed is:

1. A flexible pipe coupling for connecting pipe ends to each other, comprising a first coupling member and a second coupling member made of flexible material, each coupling member comprising a bushing for coaxially surrounding a respective pipe end, and a flexible flange extending substantially radially to a longitudinal bushing axis, each bushing and its flange forming an integral one piece coupling member, at least one hose clamp for securing each of said bushings to the respective pipe end, a support ring in contact with a back surface of each flange, said back surface facing axially away from another respective flange, each support ring having a circumferential conical surface, and a clamp member engaging said conical surfaces of said support rings to press said flanges axially together to form a seal.

2. The flexible pipe coupling of claim 1, wherein said clamp member has a circular configuration and a radially inwardly open groove with a V-cross-section that engages said conical surface of said support ring for providing an axially effective clamping force component, said clamp member further comprising a threaded clamp closure.

3. The flexible pipe coupling of claim 1, comprising an electrically conducting layer forming said contact surface on an outer surface of each bushing and on said axially facing back surface of each flange, said electrically conducting layer extending around an axially free end of the respective bushing to face radially inwardly for contacting a respective outer pipe surface, said electrically conducting layer further extending along said flange for electrically contacting said support ring of the respective flange, whereby an electrical conductor path is formed through said clamp member from one support ring to the other and from one electrically conducting pipe end to the other electrically conducting pipe end.

4. The flexible pipe coupling of claim 3, wherein said electrically conducting layer extending on said axially facing back surface of said flange reaches substantially to a circumferential rim of the respective flange.

5. The flexible pipe coupling of claim 4, wherein said electrically conducting layer has end portions extending first axially and then radially inwardly around said rim into a gap between said flanges, so that said end portions of electrically conducting layer contact each other in said gap between said flanges.

6. The flexible pipe coupling of claim 4, wherein said electrically conducting layer has end portions extending at an angle relative to the longitudinal pipe axis and in parallel to said conical surface of said support ring so that said end portions of electrically conducting layer are positioned between the conical surface of the respective support ring and a slanted inner surface of said clamp member.

7. The flexible pipe coupling of claim 6, further comprising an elastomeric layer between said conical surface of the respective support ring and the respective end portion of said electrically conducting layer bearing against said clamp member.

8. The flexible pipe coupling of claim 1, comprising an electrically conducting layer forming said contact surface on an inner surface of said bushings and on an axially facing contact surface of said flanges, whereby said conducting layer have radial portions extending into a gap between said flanges, and contact each other when the flanges are clamped together by said clamp member.

9. The flexible pipe coupling of claim 1, comprising an electrically conducting wire mesh layer in electrical contact with each pipe end for forming an electrically conducting path from pipe end to pipe end.

10. The flexible pipe coupling of claim 1, wherein said support ring has a central hole so dimensioned that at least a ring zone connecting said flanges to said bushings remains flexible.

11. The flexible pipe coupling of claim 1, wherein said support ring has an axial portion and a radial portion, said axial portion forming an axially facing rim surrounding the respective flange.

12. The flexible pipe coupling of claim 11, wherein said conical surface of said support ring extends at least in part on said axially facing rim of said axial portion of said support ring.

13. The flexible pipe coupling of claim 1, wherein each of said flanges has a conical rim extending circumferentially around said flange.

14. A flexible pipe coupling for connecting pipe ends to each other, comprising a first coupling member and a second coupling member made of flexible material, each coupling member comprising a bushing for coaxially surrounding a respective pipe end, and a flexible flange extending substantially radially to a longitudinal bushing axis, each bushing and its flange forming an integral one piece coupling member, each coupling member further having an electrical contact surface for also electrically connecting coupled pipes to each other, at least one hose clamp for securing each of said bushings to the respective pipe end, a support ring in contact with a back surface of each flange, said back surface facing axially away from another respective flange, each support ring having a circumferential conical surface, and a clamp member engaging said conical surface of said support ring to press said flanges axially together to form a seal.

* * * * *